Dec. 25, 1962 P. FITZPATRICK 3,070,124
DIFFERENTIAL VALVE
Filed Dec. 11, 1959

INVENTOR.
Paul Fitzpatrick
BY
Paul Fitzpatrick
ATTORNEY

United States Patent Office 3,070,124
Patented Dec. 25, 1962

3,070,124
DIFFERENTIAL VALVE
Paul Fitzpatrick, Detroit, Mich., assignor to General Motors Corporation, Detroit, Mich., a corporation of Delaware
Filed Dec. 11, 1959, Ser. No. 858,877
6 Claims. (Cl. 137—620)

My invention is directed to valves for control of fluid flow, and is particularly directed to a valve having the characteristic that the ratio of the control effect to the movement of the valve is very small; in other words, the valve may be said to be of a vernier type.

The invention makes possible very small changes in effective port area relative to changes in valve position. This results from differential changes in area in two reversely varied sets of valve ports. The result is a vernier control effect which would otherwise be possible only with ports of impracticably narrow width.

The invention is described herein in its preferred embodiment as an open-center type valve controlling a hydraulic motor. As such, it may be employed in the system which is the subject of U.S. Patent No. 2,974,641. It will be apparent, however, that the principles of the invention may be embodied in valves of various structure for various purposes.

The nature of the invention, and the advantages thereof, will be apparent from the succeeding detailed description of the preferred embodiment thereof, with reference to the accompanying drawings, in which.

Figure 1:
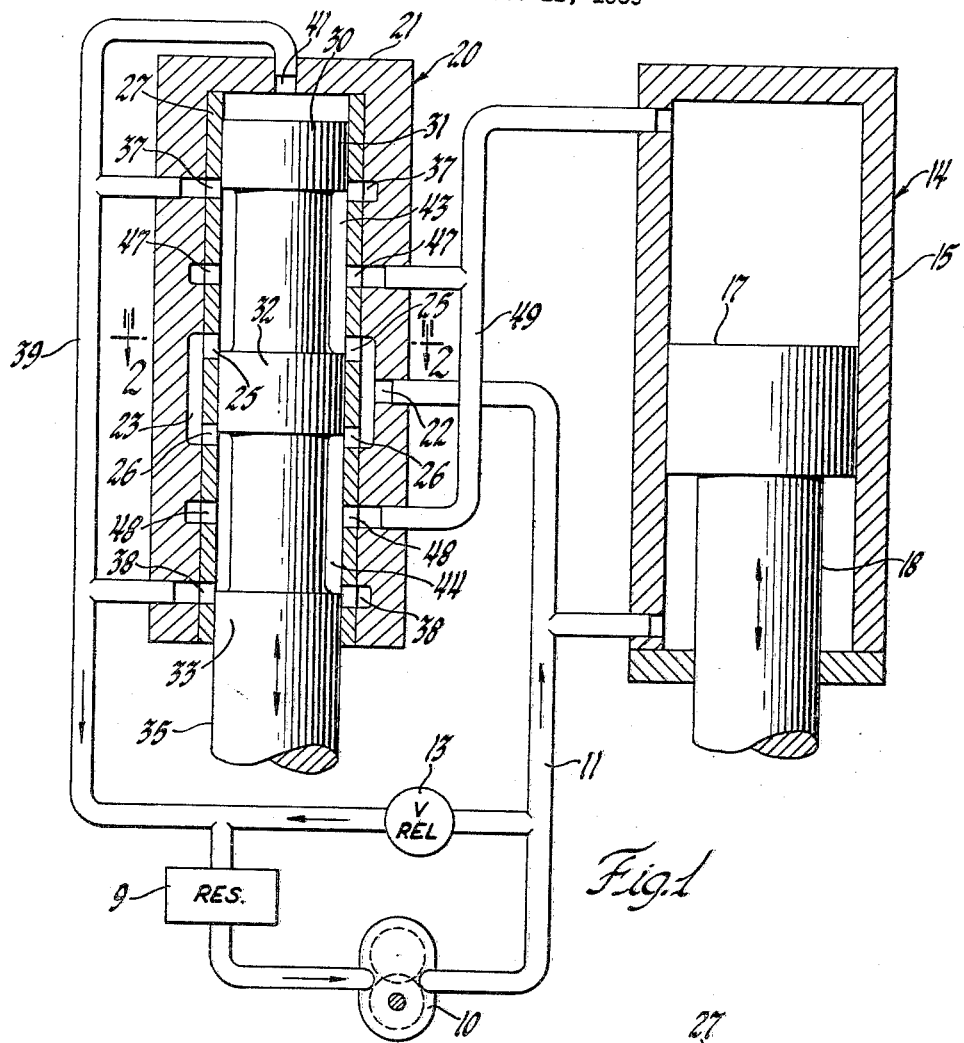
FIGURE 1 is a schematic diagram of a hydraulic system including a valve embodying the invention.
Figure 2:
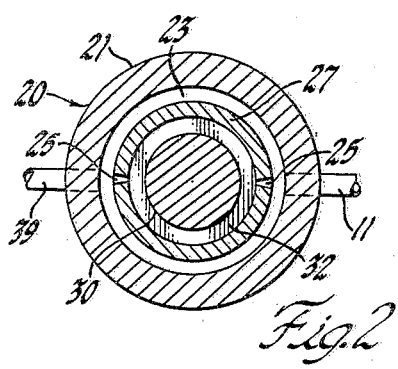
FIGURE 2 is a sectional view of the valve taken on the plane indicated by the line 2—2 in FIGURE 1.

The system illustrated in FIGURE 1 comprises a reservoir 9 for hydraulic fluid supplying a pump 10 which discharges into a conduit 11. A relief valve 13, or the equivalent, controls the pressure in conduit 11.

An expensible-chamber motor 14 of the double-acting type comprises a cylinder 15, a piston 17 reciprocable in the cylinder, and a piston rod 18 is fixed to the piston and extending from the cylinder. The conduit 11 is connected directly into the rod or small-area end of the cylinder, which is thus maintained full of fluid at pump discharge pressure.

Operation of motor 14 is controlled by a valve 20 including a body 21 having an inlet 22 supplied through conduit 11. Inlet 22 communicates through an annular recess 23 with two sets of diametrically opposed inlet ports 25 and 26 in a sleeve 27 fitted in a cylindrical bore in the body 21. Ports 25 and 26 are slit-like ports elongated axially of the body 21. Diametrically opposed ports are provided to eliminate side loading on the movable valve member or spool 30 reciprocable in sleeve 27.

Spool 30 comprises three lands, an end land 31, an intermediate land 32, and an end land 33 which may continue into a reciprocable valve operating member 35. Land reversely throttles ports 25 and 26, closing approximately half of each in the neutral position illustrated. Two sets of discharge ports 37 and 38 in the sleeve 27 are reversely throttled by end lands 31 and 33. Ports 37 and 38 are of the same configuration as ports 25 and 26, respectively. These ports connect through annular recesses and radial ports in the valve body with a discharge line 36 which returns fluid to the reservoir 9. A port 41 vents the closed end of the valve body to line 39.

The valve sleeve 27 and spool 30 define passages 43 and 44 between lands 31 and 32 and between lands 32 and 33, respectively. These passages are connected through relatively large open ports 47 and 48 in sleeve 27 and recesses in the body 21 with a controlled pressure fluid line 49 leading to the large end of cylinder 15.

Figure 3:
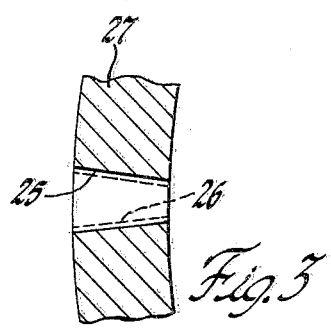
FIGURE 3 is an enlarged fragmentary sectional view on the same plane as FIGURE 2.

Ports 25 and 37 are of the same width, and ports 26 and 38 are of the same width, but of a width slightly different from ports 25 and 37. This is indicated in FIGURE 3, which shows port 26 to be slightly narrower than port 25. Since land 32 opens one of ports 25 and 26 as it closes the other, the change of port area is the product of the displacement of spool 30 by the difference in width of these ports. This difference may be made as small as desired. Similarly, lands 31 and 33 change the areas of ports 37 and 38 reversely, and the total change of discharge port area is the product of the displacement of the spool by the difference in width of ports 37 and 38.

All of ports 25, 26, 37 and 38 should be narrow to prevent excessive flow of fluid through the open-center valve; however, the difference between the widths of the ports at the two ends of the valve may obviously be much less than the minimum practicable or attainable width of a single port.

The operation of the system described above will be apparent to those skilled in the art, but may be reviewed briefly. To simplify the explanation, it may be assumed that the area of rod 18 is half that of piston 17. In this particular case, the forces on the piston are balanced when the pressure in the large end of the cylinder supplied by conduit 49 is half that in the smaller end supplied by conduit 11. This condition will be met when the total area of the inlet ports equals the total area of the discharge ports of valve 20.

Assuming, for example, that valve spool 30 is moved into the valve or upwardly as shown in FIGURE 1, inlet ports 25 will be decreased in area and the narrower inlet ports 26 will be increased in area, but to a smaller extent. Therefore, the total inlet port area will be decreased. The same movement will enlarge discharge ports 37 and contract discharge ports 38 at a smaller rate, since these are narrower. The net result is a decrease in area of the inlet ports and an increase in area of the discharge ports. This will reduce the pressure in the large end of the cylinder and cause the piston 17 to move into the cylinder or upwardly as shown in FIGURE 1. Reverse movement of the valve spool 30 has the opposite effect. The differential or vernier valve 20 thus provides means for imparting a very slow motion to the piston rod 18.

In the system of prior application No. 799,792, displacement of the valve provides a measure of the rate of movement of piston rod 18. This measurement depends upon the fact that the position of valve 30 to allow the movement of piston 17 is a function of the rate of flow of fluid to or from the large end of the cylinder. The differential valve of this invention provides for large travel of the valve for a given rate of movement of the piston rod 18. This is advantageous in providing a greater travel of valve stem 35 for a given rate of movement of piston rod 18. It has the corresponding disadvantage in a differentiating system that the greater the displacement of the valve spool, the greater is the error in the relation between input and output during transients. It will be understood, however, that the uses of the differential or vernier valve of the invention are not restricted to differentiating systems.

The detailed description of the preferred embodiment of the invention for the purpose of explaining the principles thereof is not to be considered as limiting or restricting the invention, since many modifications may be made by the exercise of skill in the art within the principles of the invention.

I claim:

1. A control valve of the open-center type adapted for control of a fluid motor comprising, in combination, a valve body, a movable valve member therein, an inlet for fluid under pressure from a source thereof, a discharge outlet, first and second inlet ports of slightly different width connected to the inlet, first and second discharge ports of slightly different width connected to the outlet, the valve body and valve member defining a passage between the first inlet and discharge ports and a passage between the second inlet and discharge ports, the valve member being so constructed that movement thereof in one direction enlarges the first inlet and second discharge ports and contracts the second inlet and first discharge ports, the valve having a control outlet connected to the said passages.

2. A control valve of the open-center type adapted for control of a fluid motor comprising, in combination, a valve cylinder, a movable valve spool therein, an inlet for fluid under pressure from a source thereof, a discharge outlet, first and second inlet ports in the cylinder of slightly different width connected to the inlet, first and second discharge ports in the cylinder of slightly different width connected to the outlet, the valve cylinder and valve spool defining a passage between the first inlet and discharge ports and a passage between the second inlet and discharge ports, the valve being so constructed that movement of the valve spool in one direction enlarges the first inlet and second discharge ports and contracts the second inlet and first discharge ports, the cylinder having a control outlet connected to the said passages.

3. A valve comprising, in combination, a valve body defining a cylindrical chamber, a valve spool having three spaced lands reciprocable in the chamber, interconnected ports in the body variably throttled in mutually reverse sense by the intermediate one of said lands, interconnected ports in the body variably throttled in mutually reverse sense by the end ones of said lands, and an outlet from the body communicating with the chamber between the intermediate land and each of the end lands, the said ports throttled in reverse sense being of slightly different width.

4. A valve comprising, in combination, a valve body defining a cylindrical chamber, a valve spool having three spaced lands reciprocable in the chamber, interconnected inlet ports in the body variably throttled in mutually reverse sense by the intermediate one of said lands, interconnected discharge ports in the body variably throttled in mutually reverse sense by the end ones of said lands, and an outlet from the body communicating with the chamber between the intermediate land and each of the end lands, the said ports throttled in reverse sense being of slightly different width.

5. A valve mechanism having a high ratio of input movement to control effect comprising, in combination, a first valve member and a second valve member, the valve members being relatively movable and defining fluid ports varied in area by such relative movement, the valve mechanism having an inlet and an outlet, the said fluid ports comprising two ports connected in parallel between said inlet and outlet acting in conjunction to control flow from said inlet to said outlet, the rates of change of area of the said ports with respect to the rate of the said relative movement being of opposite sign and of slightly different magnitude.

6. A valve mechanism having a high ratio of input movement to control effect comprising, in combination, a first valve member and a second valve member, the valve members being relatively movable and defining fluid ports varied reversely in area by such relative movement, the valve mechanism having an inlet and an outlet, the said fluid ports comprising two ports connected in parallel between said inlet and outlet acting in conjunction to control flow from said inlet to said outlet, the ports being of differing width so that the rates of change of area of the said ports with respect to the rate of the said relative movement are of opposite sign and of slightly different magnitude.

References Cited in the file of this patent
UNITED STATES PATENTS

| | | |
|---|---|---|
| 1,029,855 | Demarest | June 18, 1912 |
| 1,119,324 | Sprater | Dec. 1, 1914 |
| 1,200,826 | Forman | Oct. 10, 1916 |
| 2,273,171 | Bennett | Feb. 17, 1942 |
| 2,702,529 | Doerfner | Feb. 25, 1955 |
| 2,933,269 | Hanna et al. | Apr. 19, 1960 |